United States Patent [19]

Childs

[11] Patent Number: 5,325,199
[45] Date of Patent: Jun. 28, 1994

[54] FIELD-RATE UPCONVERSION OF TELEVISION SIGNALS

[75] Inventor: Ian Childs, Sutton, United Kingdom

[73] Assignee: British Broadcasting Corporation, London, United Kingdom

[21] Appl. No.: 910,314

[22] PCT Filed: Jan. 17, 1991

[86] PCT No.: PCT/GB91/00073
§ 371 Date: Sep. 9, 1992
§ 102(e) Date: Sep. 9, 1992

[87] PCT Pub. No.: WO91/11073
PCT Pub. Date: Jul. 25, 1991

[30] Foreign Application Priority Data

Jan. 18, 1990 [GB] United Kingdom ............... 9001172

[51] Int. Cl.$^5$ .................. H04N 7/01; H04N 7/12
[52] U.S. Cl. .................. 348/459; 348/384; 348/447
[58] Field of Search .............. 358/141, 142, 140, 14, 358/11, 12, 105, 138, 133; H04N 7/12, 7/01

[56] References Cited

U.S. PATENT DOCUMENTS

| | | | |
|---|---|---|---|
| 4,963,965 | 10/1990 | Haghiri et al. | 358/140 |
| 4,985,767 | 1/1991 | Haghiri et al. | 358/140 X |
| 5,081,531 | 1/1992 | Parker | 358/140 X |

FOREIGN PATENT DOCUMENTS

| | | |
|---|---|---|
| 0252563A2 | 7/1987 | European Pat. Off. |
| 0256860A2 | 8/1987 | European Pat. Off. |
| 0322955A1 | 12/1988 | European Pat. Off. |
| 0350765A1 | 7/1989 | European Pat. Off. |
| WO87/04034 | 7/1987 | PCT Int'l Appl. |
| WO88/01462 | 2/1988 | PCT Int'l Appl. |
| 2194409A | 5/1987 | United Kingdom |
| 2192767A | 7/1987 | United Kingdom |
| 2221813A | 7/1989 | United Kingdom |

OTHER PUBLICATIONS

IEE Colloquium, "Image Processing for HDTV", London, Oct. 26, 1989, G. M. X. Fernando: Motion compensated display conversion, pp. 4/1–4/3.
SMPTE Journal, vol. 98, No. 11, Nov. 1989, (White Plains, New York, US) Y. C. Faroudja et al.: "A progress report on improved NTSC", pp. 817–822.
A. Roberts, B. Eng., "The improved display of 625-line television pictures: Adaptive interpolation", BBC Research Report, 1985/5; pp. 1–5.
G. M. X. Fernando, "Motion Compensated Display Conversion", Proc. 1988 International Broadcasting Convention; pp. 216–219.
F. W. P. Vreeswijk et al., "HD-MAC Coding of High Definition Television Signals", Proc. 1988 International Broadcasting Convention, pp. 62–65.
T. I. P. Trew et al., "Spatially Adaptive Sub-Branches for HD-MAC", Proc. 1988 International Broadcasting Convention, pp. 66–69.
G. M. X. Fernando, "Motion Compensated Field Rate Conversion for HD-MAC Display", Proc. 1988 International Broadcasting Convention, pp. 216–219.

Primary Examiner—Victor R. Kostak
Attorney, Agent, or Firm—Robert F. O'Connell

[57] ABSTRACT

To alleviate problems experienced with field rate unconversion, a high definition source is field rate upconverted prior to bandwidth compression. Bandwidth compression is performed by a number of different methods, at least one of which is applied to the upconverted source signal. The branch or method of bandwidth compression transmission is selected in accordance with a control signal responsive to picture content. Prior to transmission of the upconverted bandwidth compressed signal, the signal is collapsed to the transmission field rate and the samples rearranged into a quincunxial configuration.

10 Claims, 5 Drawing Sheets

*Fig.1(a)* FIRST 50 Hz FIELD

*Fig.1(b)* SECOND 50 Hz FIELD

*Fig.2(a)*
FIRST 50 Hz FIELD

*Fig.2(b)* SECOND 50 Hz FIELD

FIELD-RATE UPCONVERSION OF TELEVISION SIGNALS

BACKGROUND OF THE INVENTION

1. Field of the Invention

This invention relates to a method and apparatus for upconverting the field rate of a television signal. In particular it is concerned with upconversion of time division multiplex signals such as HD-MAC although it is also applicable to frequency division signals such as PAL, NTSC or SECAM.

DESCRIPTION OF THE RELATED ART

One major disadvantage of a 50 Hz field rate for High Definition Television (HDTV) signals is that display on large screens is severely prejudiced by the presence of brightness flicker. The generally accepted remedy for this is to unconvert the field-rate of the received signal to a higher value, such as 75 or 100 Hz, before display. There is a wide range of techniques available for such upconversion, some of which use a fixed algorithm and some of which are motion-adaptive or motion compensated; of the latter techniques some take advantage of Digitally Assisted Television (DATV) information, sent as part of the transmission coding bandwidths, and some do not. Examples of known techniques are given in BBC Research Report 1985/5 entitled 'The Improved Display of 625-line television pictures: adaptive interpolation', and in a paper entitled 'Motion compensated Field Rate Conversion for HD-MAC Display' by G M X Fernando and D W Parker. Proc. 1988 International Broadcasting Convention pp 216–219.

It is important that the final format chosen for the transmitted HDTV signal (which will include the information transmitted via DATV) should allow for the greatest number of possible receiver options. The performance achieved from the best of the algorithms developed for bandwidth compressing HDTV into available MAC satellite broadcasting channel is sufficient to suggest that display upconversion is the weakest link in the signal processing chain. This is because the fundamental processes involved in display upconversion are very different from those in bandwidth compression. Display upconversion attempts to generate new information (additional television fields corresponding to instants in time at which no incoming field existed), whereas bandwidth compression merely attempts to minimise the loss of already existing information in the signal transmission system.

Most of the higher-quality bandwidth compression systems are motion-compensated, motion-adaptive algorithms, whereby the incoming television picture is split into a number of small blocks. Each block is encoded separately, via one or two or more coding branches. The coding branch that is considered to be producing the closest approximation to each block of the incoming signal is selected for transmission of that particular block; such a strategy is known as 'fidelity checking' or 'a posteriori' motion detection. Motion compensation is used in at least one of the coding branches to allow fine detail to be transmitted, spread out over several fields, on picture areas tracked by an appropriate motion vector. In areas where no reliable motion vector exists—or, in some algorithms, where the magnitude of the detected motion vector exceeds a certain threshold—a 'fallback', non-motion-compensated, branch is used; this branch transmits each television field separately, but at a lower spatial resolution. Branches are usually identified according to the time period over which a complete picture is built up; thus a 40 msec branch transmits each HDTV picture spread out over a period of 40 msec. Examples of these bandwidth compression systems are described in a paper entitled 'Motion Compensated DATV Bandwidth Compression for HDTV']by R Storey, Proc. 1988 International Broadcasting Convention pp 78–81; and a paper entitled 'HD-MAC coding of high definition television signals' by F.W.P. Vreeswijk Proc. 1988 International Broadcasting Convention pp 62–65.

Field-rate upconversion of the reconstructed HDMAC signal can take advantage of the information transmitted via the DATV channel. For example, one prior art technique demonstrated in the Eureka 95 pavilion at the 1988 International Broadcasting Convention was the sue of branch selection information to also control a motion-adaptive 50/100 Hz field-rate upconverter. This idea has been extended in more recent work within the Eureka 95 project to include the use of motion vector compensation in the 40 msec areas of the picture where such motion vector information is available. While such techniques enhance the quality and reliability of the upconversion process, however, they have the unfortunate side-effect of also increasing the visibility of switching boundaries between picture blocks transmitted by different coding branches.

One prior art method of upconversion has attempted to reduce the visibility of branch switching by applying motion-compensated upconversion in areas of the picture transmitted via the fallback branch (motion vectors would not normally be required for these areas for HD-MAC encoding alone). This technique is described in a paper entitled 'Motion Compensated Display Conversion' presented to the Colloquium on High Definition Television of the Instutute and Electrical Engineers (United Kingdom) on Oct. 26, 1989, by G M X Fernando.

This prior art technique is difficult to apply as the motion speeds of objects coded via the feedback branch can be very high indeed. This necessitates a motion vector measurement system which can track objects at well over 20 pixels/field period. Furthermore, the 20 msec coding path is used for objects which do not have a reliable vector associated with them, such as uncovered or obscured background. A system which relies on the assignment of a motion vector to such areas is not ideal.

Thus, we have appreciated that display unconversion should also include a fallback mode for use in areas in which motion areas are unreliable. A problem which arises from this is that of selection of picture areas to be upconverted by such a fallback mode. Detection could for example be achieved in an a priori fashion; that is, by examining the errors arising from the motion vector assignment process in each coding branch before the particular coding branch has been selected. Areas of the picture with a low assignment error would then be motion vector compensated regardless of which coding branch is subsequently used. Areas where the assignment errors are high and which cannot have a motion vector adequately assigned to them would be upconverted in the fallback mode.

SUMMARY OF THE INVENTION

The present invention departs from the methods of upconversion outlines above and aims to provide a method and apparatus for upconversion which is both of greater reliability and higher quality than the prior art systems. In its broadest terms the invention involves the upconversion of the television signal prior to bandwidth compression.

More specifically, the invention is defined by the claims, to which reference should now be made.

In a preferred embodiment, a 1250/50 studio signal is upconverted to a 100 Hz field rate in the studio. After upconversion, the signal is bandwidth compressed by a modified HD-MAC encoder which, in principle, bandwidth compresses the 1250/100 signal by a factor of a eight rather than by a factor of four which is usual for the 1250/50 signal.

The invention has the advantage that, when used with an HD-MAC encoder, the upconversion is free from restrictions in the amount of digital assistance data that can be carried by the signal. This has the further advantage that pixel rather than block-based techniques may be used which increases picture quality.

However, the invention is not limited to MAC type signals and may be applied to PAL, NTSL, SECAM and other frequency division signals. In such cases the signal transmitted must have additional capacity for DATV signals which would have to be sent with the signal. An embodiment of the invention will now be described, by way of example only, and with reference to the accompanying drawings, in which:

DESCRIPTION OF THE PREFERRED EMBODIMENTS

Figure 1A:
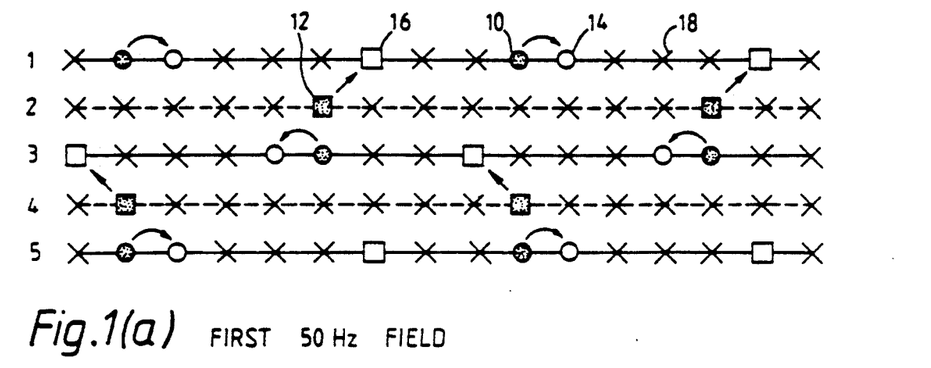
FIGS. 1A and 1B show an example of the sample structure of two field of a 100 Hz field rate signal.
Figure 1B:
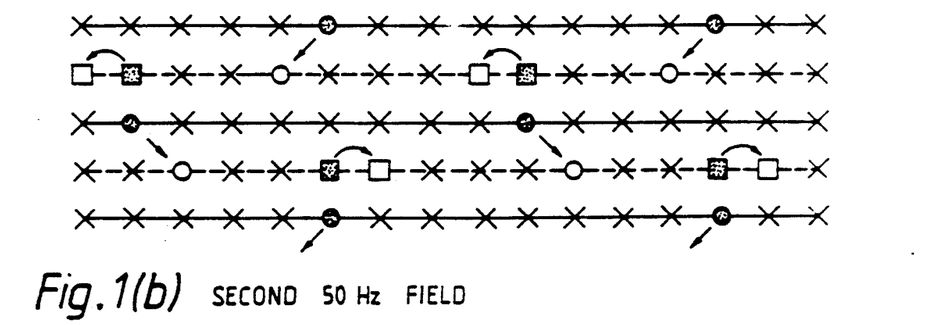

FIGS. 1(a) and 1(b) shows sampling structure which may be adopted to maximize the utility of an increase in upconverter quality. This structure would be used in the fallback areas of the 20 msec coding path, to reduce temporal blurring of areas moving in an uncorrelated fashion. Areas of the picture which can be adequately assigned motion vectors in the 20, 40 and 80 msec coding paths will be unaffected. This then reduces the problems outlined above, of enhanced transitions between the areas transmitted by different coding branches. The fallback mode is modified so that it is effectively a 10 msec coding branch; this means that each 100 Hz field is coded at one eighth spatial resolution.

In FIG. 1(a) and 1(b) two fields of the 50 Hz field rate signal to be transmitted are shown. Considering the first field shown in FIG. 1(a), this field comprises two fields of interlaced upconverted 100 Hz signal: field 1 shown on liens 1, 3 and 5 and field 2 on liens 2 and 4. The 50 Hz signal to be transmitted comprises lines 1, 3 and 5 only. the 100 Hz signal is compressed by seven eighths in the 10 msec coding branch and the position of the samples selected from the first 100 Hz field are shown by shaded circles 10. The position of the samples selected from the second field are shown by shaded squares 12.

To preserve a quincunxial sampling structure compatible with existing motion compensated bandwidth reduction systems, the samples must be shifted for transmission at 50 Hz. To this adjacent liens of the 100 Hz signal are collapsed into one another and the sample positions are shifted one place to the right on liens 1 and 3 of the 50 Hz field and one place to the left on line 2 of the 50 Hz field in order to retain the sampling structure. The position of samples 10 in the transmitted 50 Hz field is shown by hollow circles 14 and the position of samples 12 by hollow squares 16. Discarded samples are marked by crosses 18.

In the second 50 Hz field the first lines of the two 100 Hz fields are collapsed by moving the samples by the first field down in the opposite way from the first 50 Hz field. This enables the sample structure to be maintained in the 50 Hz interlaced signal.

The sample structure of the 10 msec coding branch shown in FIGS. 1(a) and 1(b) sacrifices horizontal resolution in favour of retaining temporal resolution. The reader skilled in the art will understand that alternative structures could be used which sacrifice vertical rather than horizontal resolution. Using the sampling structure shown, displays operating at 100 Hz field rates approach the picture quality available at the output of the studio upconverter.

The method described has a disadvantage in that non field rate upconverted displays will suffer a corresponding loss in quality. These displays will display the samples originating from two adjacent 100 Hz fields simultaneously and will therefore exhibit a degree of double imaging similar to that shown by existing upconverters operating on AABB algorithms. However, this loss of quality is not considered to be commercially damaging as 50 Hz non-upconverted displays will represent the lower end only of the receiver market.

The algorithms described may be introduced as a compatible enhancement to an existing service, maximising flexibility.

The 100 Hz field rate is just one example of the upconversion that can be performed in the studio prior to bandwidth compression. Another alternative would be to use a 75 Hz field rate, any other rate may be used as desired. Upconversion to rates other than 100 Hz and in particular to 75 Hz allows lower scan frequencies to be used in the display and hence results in a power and cost saving. However, the complexity of the upconverter required to implement this is increased. As the invention requires the upconverter to be located in the studio rather than in individual receivers this increase in complexity does not produce unacceptable cost increase.

Figure 2A:
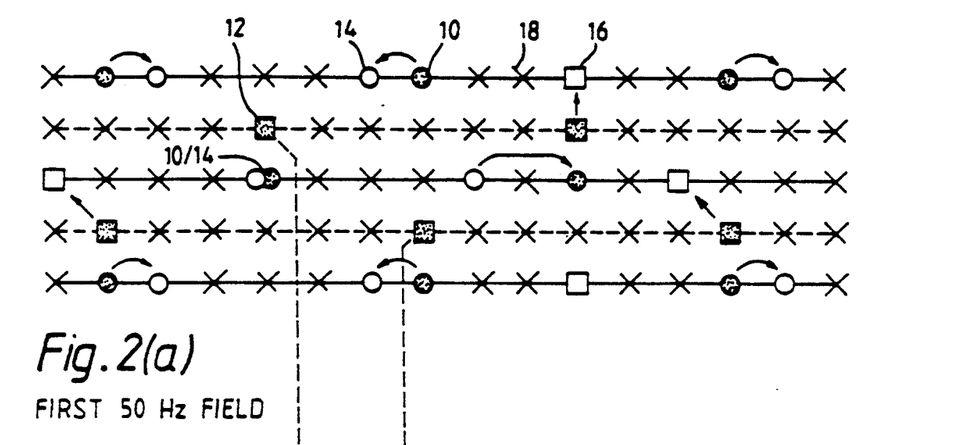
FIGS. 2A and 2B show an example of the sample structure of two field of a 75 Hz field rate signal.
Figure 2B:
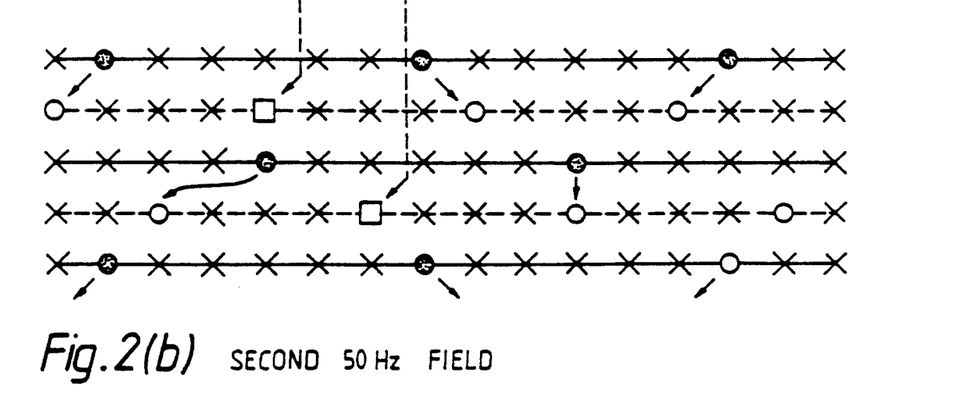

FIGS. 2(a) and 2(b) show the sampling structure of the fallback mode in a 75 Hz converted signal. With a 75 Hz upconversion the coding branch decisions are not affected as these may be made every 40 msecs; that is ever there fields of the upconverted standard. The sample structure of FIGS. 2(a) and 2(b) is derived in a similar way to that of FIGS. 2(a) and (b) and the same terminology is used for samples at the 75 Hz upconverted rate and the 50 Hz transmission rate. However, the signal now contains a component at 25 Hz and to preserve the sampling structure the rearrangement of selected 75 Hz samples is more complex. This rearrangement is shown by the arrows in FIGS. 2(a) 2(b). In the first 50 Hz field samples on odd numbered lines are rearranged at a different position within their lines. In some cases no repositioning is needed. However, on even numbered lines samples are alternately rearranged on the line above or the corresponding line of the second 50 Hz field.

Figure 3:
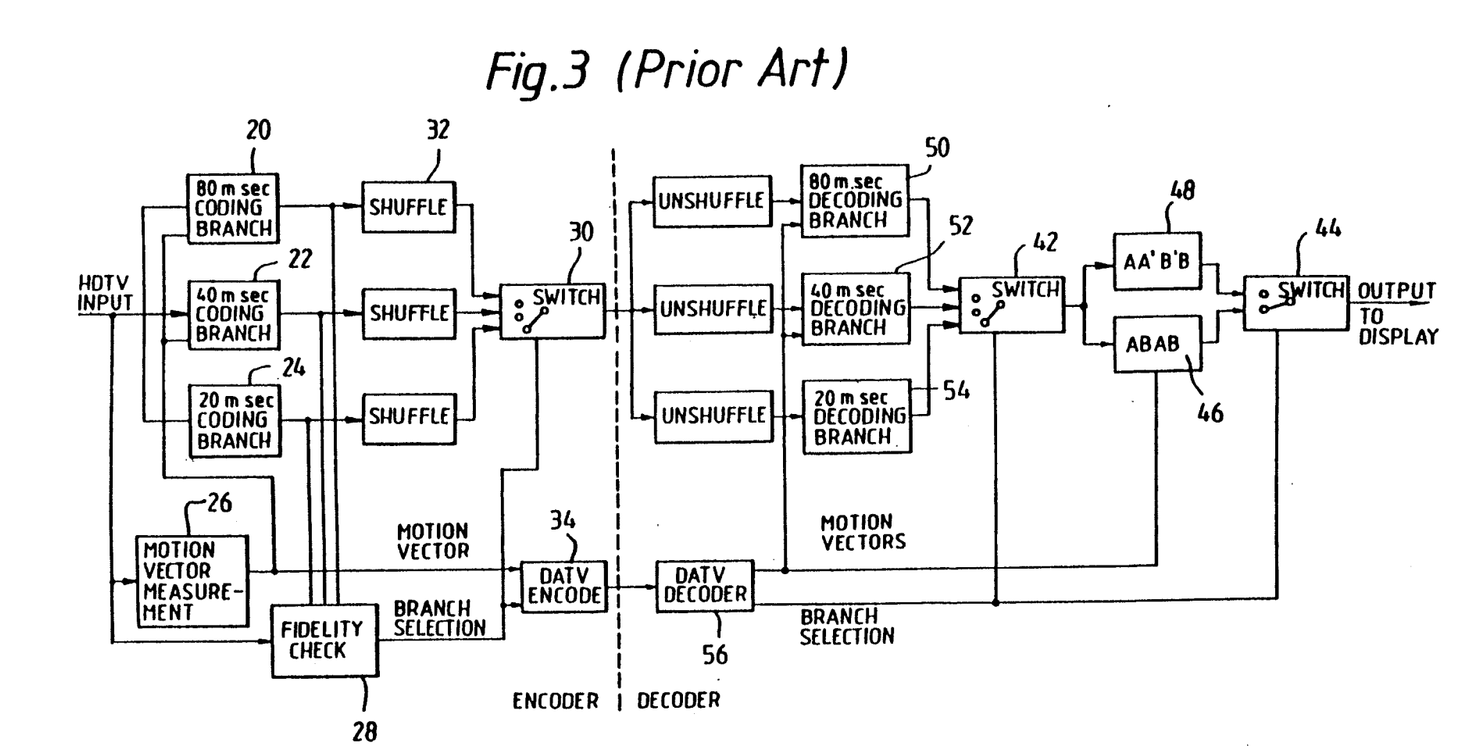
FIG. 3 is a block diagram of an HDTV prior art bandwidth compression and reception system.

FIG. 3 shows a block diagram of a conventional bandwidth compression and reception system for HDTV. This circuit is, in essence, described in more detail in our international patent application WO87/04034 to which reference is directed. For understanding the present invention a brief description only will be given. HDTV signals (1250/50/2:1) are input to three coding branches 20, 22, 24, in parallel. These three coding branches represent 80, 40 and 20 msec coding respectively. The 40 and 80 msec branches 22, 20 are compensated for movement by the measured motion vectors in the incoming picture which are measured at 26. The outputs of each coding branch are fed to a fidelity checker 28 which is also supplied with the HDTV input. The fidelity checker 28 checks the outputs of the three coding branches against the HDTV input to determine which is the most faithful to the original signal. The fidelity check then outputs a branch selection signal to a three pole switch 30 which selects the appropriate coding branch for transmission. Before being fed to the switch 30, the output of each coding branch is rearranged, or shuffled, into a 625 line format, at 32, for transmission. This shuffling collapses two lines of 1250 line standard into one line of 625 line standard and is described in more detail in our international patent application PCT/GB86/00799, published as WO88/01462. A DATV signal is transmitted with the selected output from the coding branch. The DATV signal is an indication of the motion vectors measured by the motion vector measurement unit 26. The motion vectors are encoded into DATV form in a DATV encoder 34 which is also fed with the branch selection signal from fidelity checker 28. This is necessary as no motion vector information need be sent when the 20 msec coding branch 24 has been selected and thus transmission of redundant information is avoided.

The decoder 40 is a mirror of the encoder. The DATV data is decoded and motion vector and branch selection signals are extracted and fed to switches 42 and 44 and upconverters 46 and 48 respectively. The received video signal is unshuffled and decoded in three parallel branches, 50, 52, 54. In each of these the decoding is compatible with a signal encoded in an 80, 40 or 20 msec branch. The output of each of the three decoders is fed t switch 42 which is controlled by the branch selection signal from DATV decoder 56. The selected decoded signal is then fed to the field-rate upconverter which has two paths 46, 48. Path 46 employs an ABAB algorithm for use in all stationary or motion-compensated areas whereas branch 48 uses an AA'B'B algorithm for use in areas of uncorrelated movement. The motion vectors for the ABAB branch are supplied from the DATV decoder 56 and are selected when decoding has been via either the 80 or 40 msec decoding branches 50 and 52. The branch selection signal decoded from decoder 56 sets switch 48 to the output of one of the branches of the field upconverters 46, 48 and the selected branch is then displayed.

Figure 4:
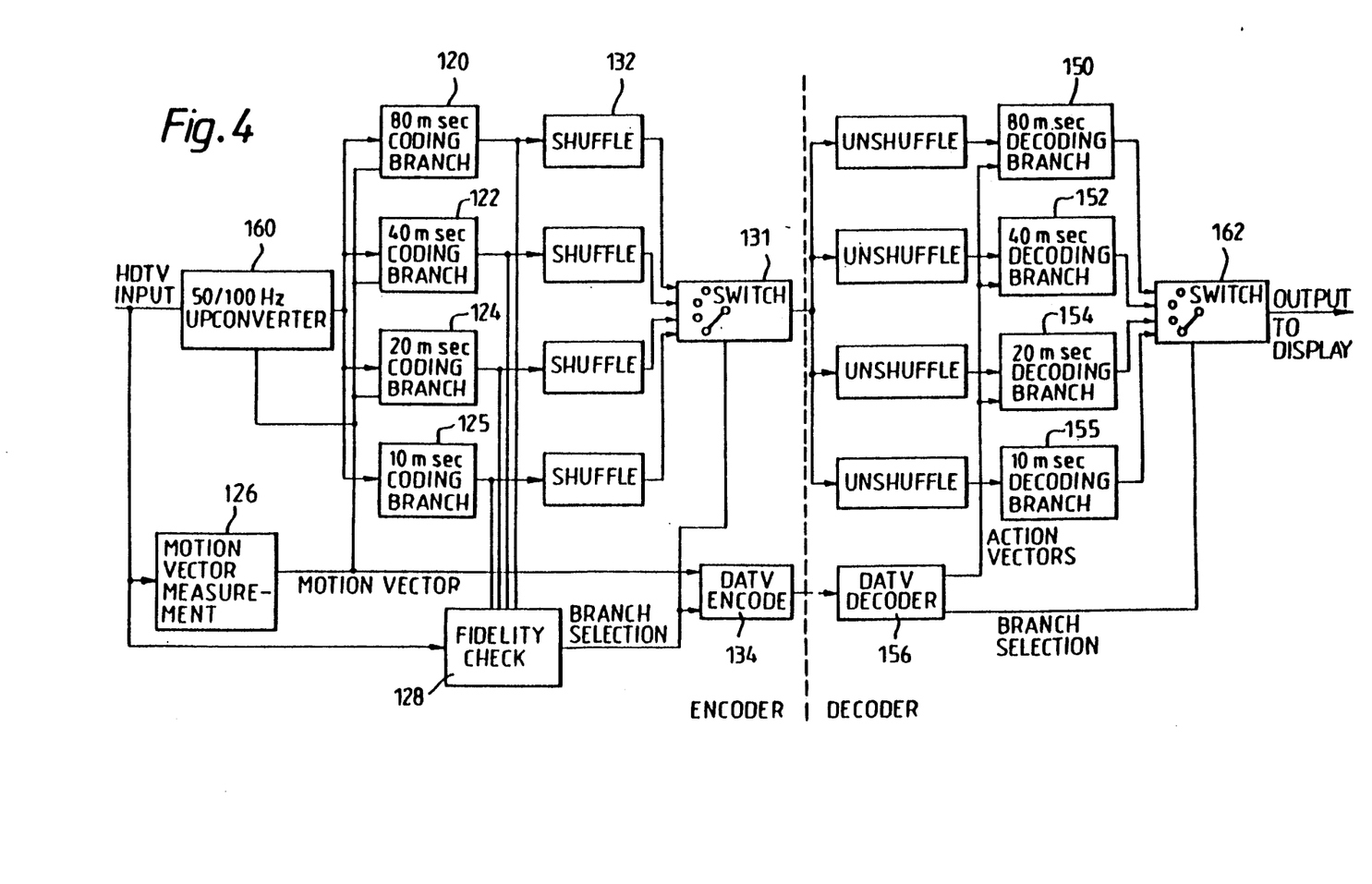
FIG. 4 is a block diagram of a bandwidth compression and upconverter system embodying the invention.

FIG. 4 shows how the circuit of FIG. 3 is modified in an embodiment of the invention. As mentioned previously it is necessary to include a 10 msec coding branch into the bandwidth compression encoder. Furthermore, it is necessary that motion vector information is supplied to all four of the coding branches. In FIG. 4, like components are referred to by the same numbers as FIG. 3 but incremented by 100. The 1250/50/2:1 HDTV input is supplied to the fidelity checker 128, motion vector measurer 126 and to a 50:100 Hz unconverter 160. The detected motion vectors are also supplied to the unconverter 160 and the 100 Hz unconverted field rate signal is supplied in parallel to each of the four coding branches 120, 122, 124 and 125. The outputs of each coding branch are shuffled in shufflers 132 to form them into the correct quincunxially sampled 625 line signal for transmission and then fed to the inputs a four pole switch 131. The input of the switch 131 selected, and thus the coding branch transmitted, is controlled by a branch select signal from fidelity checker 128. In addition, the signal is transmitted with a DATV signal representing the motion vectors and branch selection signals. The DATV signal may be transmitted in the vertical blanking interval.

By using the same motion vectors in the upconverter 160 as in the coding branches 120 and 122, duplication of hardware is avoided. The coding branches of FIG. 4 are analagous to those of FIG. 3 but operate at a subsampling factor of 8:1 rather than 4:1. Thus, the 80 msec branch 120 assembles a complete picture over eight incoming fields rather than four.

The signal processing used for the 20 msec coding branch 24 of FIG. 3 is split into two separate branches, 124 and 125, operating over periods of 20 and 10 msec respectively. The 20 msec branch is appropriate for those parts of the scene that are moving in a way that is correlated form one incoming 100 Hz field to the next whereas the 10 msec branch 125 is the 'fallback' branch for areas in which the movement is uncorrelated between 100 Hz fields or for areas of uncovered background. In this branch the sample structure of FIG. 1 is applied to the upconverted field rate signal.

The decoder 140 is similar to decoder 40 of FIG. 3 except that an extra unshuffler and 10 msec decoding branch 155 is included. Because the decoding branches 150, 152, 154, 155 expand by a factor of 8:1 rather than 4:1—i.e. to an output field rate of 100 Hz rather than 50 Hz there is now no need for a separate display field-rate upconverter. Thus, the output to the display is that decoded signal selected by switch 162 which is controlled by the branch selection signal decoded by DATV decoder 156. The signal processing of FIG. 4 may be simplified substantially once it is recognised that no additional information is carried by the extra fields generated in the 50/100 Hz upconversion process in areas that are adequately motion compensated; that is the 40 and 80 msec coding branches. Furthermore, to obtain the best possible picture quality and compatibility, it is desirable that the subsamples selected for transmission should refer as far as possible to the original 50 Hz fields of the incoming signal. Moreover, if areas can be adequately motion tracked over a period of 40 or 80 msec, then the motion vector should also be capable of tracking the motion over the 10 msec period demanded for field-rate upconversion. In principle, this is also true for areas appropriate to the 20 msec branch.

Figure 5:
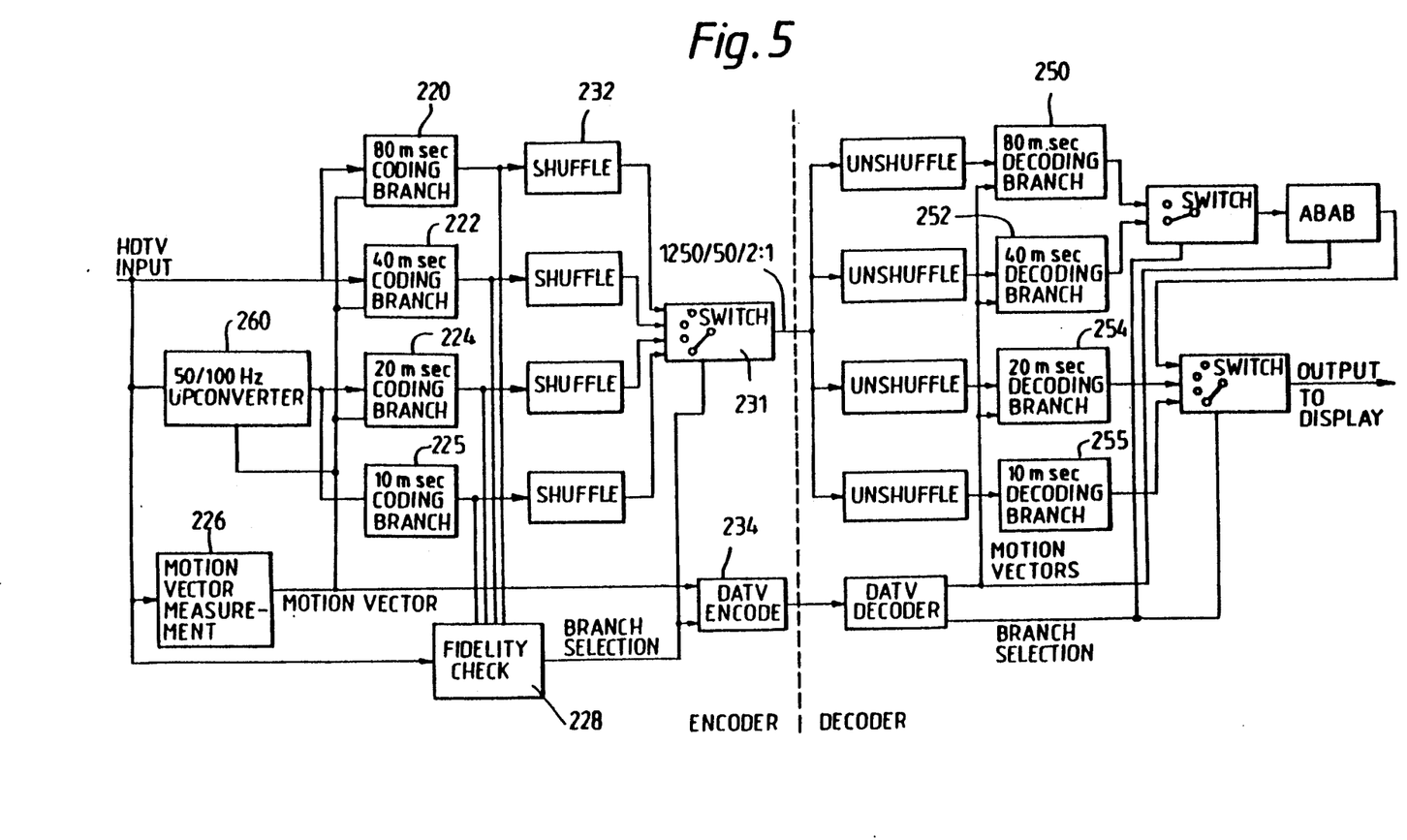
FIG. 5 is a possible simplification of the system of FIG. 4.

In practice, this simplication is not possible for the 20 msec branch as a fidelity check must be made between the 20 and 10 msec branches. This check must be carried out on the 100 Hz field-rate signal from the upconverter, in order to distinguish between areas which are correlated over a 20 msec period, and which are therefore appropriate to motion compensate for upconversion, and areas which have no correlation at all. FIG. 5 shows how the simplification may be put into practice of the 80 and 40 msec branches. In this figure, like components of FIGS. 3 and 4 are prefixed by a numeral 2.

In FIG. 5, the HDTV input is supplied directly to the 80 and 40 msec coding branches 220 and 222, whereas the 20 and 10 msec coding branches 224 and 225 are provided with a 100 Hz field rate upconverted input. Motion vectors are supplied to the 20, 40 and 80 msec branches 224, 222 and 220 and also to the upconverter 260. The decoder is simplified in a similar way, an upconverter 262 upconverting the 50 Hz selected output of the 40 and 80 msec decoding branches 250, 252 before output selection is made at switch 266.

Although the circuitry of FIG. 5 appears to be more complex than that of FIG. 4, it should be remembered that large sections of the signal processing, the 80 and 40 msec branches are now operating at only half of the clock frequency of the FIG. 4 embodiment. Moreover, much of the hardware of the FIG. 3 prior art embodiment can be utilised. This means that first-generation encoders can be extended for use with the invention. It can also be seen that the decoder of FIG. 5 retains a high degree of commonality with that of FIG. 3.

Some modification to the fidelity checker 228 is required in the FIG. 5 embodiment as the fidelity of the 40 and 80 msec paths is checked in comparison with a different reference from that of the 10 and 20 msec paths. Thus, some additional scaling factor must be applied to compensate for the fact that two of the branches have been checked against a higher number of incoming fields that the other two.

The invention as described provides a high quality, reliable system of upconversion. As the upconversion takes place in the studio prior to transmission, the complexity of the upconverter is a relatively minor issue. Thus, compensation may be used in some areas of uncovered or unobscured detail. Furthermore, it is possible to upgrade the upconverter as technology advances. This possibility would not exist if upconversion were to be solely receiver based.

I claim:
1. A video signal encoder comprising a video signal source;
   means for up-converting the field rate of the video signal;
   means for compressing the bandwidth of the video signal by two or more different methods, at lest one of the methods being applied to the field rate up-converted signal, the compression means comprising a plurality of branches each corresponding to a compression method;
   means for deriving motion vectors from the video signal source, the motion vectors being indicative of the degree of movement associated with the image represented by the signal;
   means for applying the motion vectors to those branches of the bandwidth compression means arranged to compress the bandwidth of video signals corresponding to stationary scenes or correlated movement, at least one of the bandwidth compression branches being arranged to compress signals corresponding to uncorrelated movement;
   means for selecting the source signal compressed by one of the methods in response to a control signal;
   means for transmitting the selected bandwidth-compressed video signal in analog form;
   control signal generating means responsive to the picture content of the video signal generated by the source to generate the control signal to command the selection means to select a required one of the bandwidth compressed signals; and
   means for transmitting a digital signal comprising the control signal and the motion vectors in association with the analog video signal;
   characterised in that the field rate up-converted signal is applied only to the branch of the bandwidth compression means corresponding to uncorrelated movement and the branch corresponding to correlated movement with the highest degree of movement.

2. A video signal encoder comprising a video signal source;
   means for up-converting the field rate of the video signal;
   means for compressing the bandwidth of the video signal by two or more different methods, all of which are applied to the field rate up-converted signal, the compression means comprising a plurality of branches each corresponding to a compression method;
   means for deriving motion vectors from the video signal source, the motion vectors being indicative of the degree of movement associated with the image represented by the video signal;
   means for applying the motion vectors to those branches of the bandwidth compression means arranged to bandwidth compress video signals corresponding to stationary scenes or correlated movement, at least one of the bandwidth compression branches being arranged to compress signals corresponding to uncorrelated movement;
   means for selecting the source signal compressed by one of the methods in response to a control signal;
   means for transmitting the selected bandwidth-compressed video in analog form;
   control signal generating means responsive to the picture content of the video signal generated by the source to generate the control signal to command the selecting means to select a required one of the bandwidth compressed signals; and
   means for transmitting a digital signal comprising the control signal and the motion vectors in association with the analog video signal;
   characterised in that the branches of the bandwidth compression means corresponding to stationary scenes or correlated movement include means for discarding the up-converted fields.

3. A video signal encoder according to claim 1 or 2, wherein the branch corresponding to uncorrelated movement comprises a spatial filter and the branches to which the motion vectors are applied comprise vertical-temporal or horizontal-temporal filters.

4. A video signal encoder according to claim 1 or 2, wherein the field rate upconverting means upconverts the field rate of the source signal to 100 Hz.

5. A video signal encoder according to claim 1 or 2, wherein the field rate upconverting means upconverts the field rate of the source signal to 75 Hz.

6. A video signal encoder according to claim 1 or 2, wherein the bandwidth compression means comprises means for downconverting the bandwidth compressed upconverted source signal to a transmission field rate and for rearranging the samples of the downconverted signal into a desired sample structure for transmission.

7. A video signal encoder according to claim 6, wherein the samples at transmission field rate are rearranged into the quincunxial structure.

8. A method of encoding a video signal for transmission comprising:
upconverting the field rate of a signal generated from a video signal source;
compressing the bandwidth of the video signal by two or more different methods, at lest one of the methods being applied to the field rate up-converted signal;
driving motion vectors from the video signal source, the motion vectors being indicative of the degree of movement associated with the image represented by the video signal;
applying the motion vectors to assist in bandwidth compression of video signals corresponding to stationary scenes or correlated movement, the bandwidth compression including compression of signals corresponding to uncorrelated movement;
selecting the source signal compressed by one of the methods in response to a control signal;
transmitting the selected bandwidth-compressed video signal in analog form;
generating a control signal responsive to the picture content of the video signal generated by the source to command the selecting means to select a required one of the bandwidth compressed signals; and
transmitting a digital signal comprising the control signal and the motion vectors in association with the analog video signal;
characterised in that the methods of bandwidth compression applied to the field rate up-converted signal comprise methods appropriate to uncorrelated movement and correlated movement of the highest degree.

9. A video signal encoder comprising means for receiving a transmitted analog bandwidth compressed video signal in which bandwidth compression has been achieved by one of two or more different methods, at least one of which is applied to a field rate up-converted signal;
means for receiving a digital signal transmitted in association with the analog signal to extract therefrom a control signal and motion vectors indicative of the degree of movement associated with the image represented by the video signal;
means for reconstituting the signal for display according to one of two or more different methods, at least one method comprising reconstituting the signal at an up-converted field rate;
means for applying the extracted motion vectors to branches of the reconstituting means corresponding to stationary scenes or correlated movement; and
selection means controlled by the control for selecting one of the reconstituted signals for display;
characterised by means for up-converting the field rate of signals reconstituted at the field rate of the transmitted signal.

10. A video signal transmission system comprising, at a transmitter:
a video signal source;
means for up-converting the field rate of the video signal;
means for compressing the bandwidth f the video signal by two or more different methods, at least one of the methods being applied to the field rate up-converted signal, the compression means comprising a plurality of branches each corresponding to a compression method;
means for deriving motion vectors from the video signal source, the motion vectors being indicative of the degree of movement associated with the image represented by the video signal;
means for applying the motion vectors to those branches of the bandwidth compression means arranged to compress the bandwidth of the video signals corresponding to stationary scenes or correlated movement;
means for selecting the source signal compressed by one of the methods in response to a control signal;
means for transmitting the selected bandwidth-compressed video signal in analog form;
control signal generating means responsive to the picture content of the video signal generated by the source to generate a control signal to command the bandwidth compression means to select a required one of the bandwidth compression means; and
means for transmitting a digital signal comprising the control signal and the motion vectors in association with the analog video signal;
and at a receiver;
means for receiving a transmitted analog bandwidth compressed video signal in which bandwidth compression has been achieved by one of two or more different methods, at least one of which is applied to a field rate up-converted signal;
means for receiving a digital signal transmitted in association with the analog signal to extract therefrom a control signal and motion vectors indicative of the degree of movement associated with the image represented by the video signal;
means for reconstituting the signal for display according to one of two or more different methods, at least one method comprising reconsituting the signal at an up-converted field rate;
means for applying the extracted motion vectors to branches of the reconstituting means corresponding to stationary scenes or correlated movement; and
selection means controlled by the controller selecting one of the reconstituted signals fir display;
characterised in that at the transmitter, the field rate up-converted signal is applied only to the branch of the bandwidth compression means corresponding to uncorrelated movement and the branch corresponding to correlated movement with the highest motion vectors, and that the receiver comprises means for up-converting the field rate of signals reconstituted at the field rate of the transmitted signal.

* * * * *